Patented Mar. 15, 1938

2,110,880

UNITED STATES PATENT OFFICE 2,110,880

CATALYTIC HYDRATION OF OLEFINES

Walter Philip Joshua, Cheam, Herbert Muggleton Stanley, Tadworth, and John Blair Dymock, Sutton, England No Drawing. Application August 2, 1934, Serial No. 738,158. In Great Britain August 24, 1933

12 Claims. (Cl. 260—156)

The present invention relates to the catalytic hydration of olefines by the combination of the olefines and water vapour to form the corresponding alcohols. The mechanical stability of catalysts suitable for such conversion is of considerable importance especially when high partial pressures of steam are used at high temperatures.

According to the present invention the hydration of the olefines is effected with the aid of a catalyst rendered mechanically stable, without its activity being impaired, by incorporating with the active catalytic material during preparation of the catalyst a non-drying vegetable oil such as castor oil or rape oil.

The preparation of the composite catalyst comprises an intimate mixing and baking of the ingredients.

The incorporation of the above-mentioned substances in the catalyst proper is particularly applicable to catalysts consisting of phosphates containing an excess of phosphoric acid over and above the amount required to form the orthophosphate of the element or elements employed. When attempt is made to use catalytic material containing relatively large amounts of phosphoric acid under conditions of high partial steam pressure such as is required at total working pressures between 20 and 100 atmospheres without first preparing the material as above described, it tends to break down mechanically. The mechanical stability of such material could be improved by decreasing the amount of phosphoric acid present in it, but we have found that this reduces materially the activity of the material and diminishes the amount of alcohol which can be produced per unit volume of such material.

The general method of preparation of the composite catalyst is first to mix thoroughly the plain catalyst in finely divided form with a quantity, up to 20 per cent. by weight of the catalyst, of any of the additional bodies above mentioned. The mass is then baked, ground, tabletted or pelleted and re-baked at a suitable temperature, for example, 250° C., for a period of one or more hours. Alternatively a part of the total quantity of the additional body may be incorporated in the catalytic material during the preparation prior to baking and grinding and the remainder of the additional body may be added after grinding and before tabletting and re-baked.

The following examples illustrate the manner in which the composite catalyst may be prepared and the results obtained by using it for the hydration of olefines according to the present invention:—

Example I

A mixture of 1 molecule of manganese oxide, ½ mol. of boron trioxide and 3.6 mols of phosphoric acid was evaporated to dryness with 5 per cent. of castor oil and the dried mass baked at 200° C. The mass obtained was ground and tabletted with the addition of 2 to 3 per cent. of linseed oil as binder and re-baked. Over a catalyst prepared in this manner and maintained at a temperature of 260° C. a mixture of ethylene and steam at the rate of 400 litres of the ethylene per hour measured at normal temperature and pressure was passed at a total pressure of 20 atmospheres, the steam pressure being 6 atmospheres. A yield of 8.6 grams per 100 cc. of catalyst was obtained per hour. Using 40 atmospheres total pressure, the steam pressure being 10 atmospheres and the rate of supply of ethylene being 1100 litres per hour measured at normal temperature and pressure, the yield of alcohol was 19.3 grams per 100 cc. of catalyst per hour. This yield was maintained during 50 hours of running and the catalyst had suffered no deterioration whatever.

Example II

The catalyst was prepared by evaporating 1 molecule of calcium oxide, ½ mol. boron trioxide and 2.6 mols phosphoric acid with 5 per cent. of rape oil, and baking the mass at 200° C. The baked mass was ground and tabletted with 2½ per cent. linseed oil as binder and rebaked. Over this catalyst a mixture of propylene and steam was passed at a temperature of 260° C. under a total pressure of 20 atmospheres, the steam pressure being 9.5 atmospheres, at a rate of 400 litres of the propylene per hour, measured at normal temperature and pressure. The output of isopropyl alcohol was 15.1 grams per 100 cc. of catalyst per hour. This output was maintained for several days and the catalyst suffered no deterioration whatever.

Catalysts similar to those above described but without the inclusion of the mechanical stabilizing ingredient could not have been produced in a form sufficiently friable to allow of tabletting and would under the pressure conditions have changed to a mud within about two hours and would not have given such high yields of alcohol.

What we claim is:—

1. In the catalytic conversion of olefines and water vapour into alcohols by subjecting them to the action of a catalytically active solid hydration catalyst comprising essentially a hydration phosphate catalyst and excess phosphoric acid, the step of rendering the catalyst physically stable under the reacting conditions by forming dispersed therein the residue of a non-drying vegetable oil resulting from baking a mixture thereof with said material.

2. In the catalytic conversion of olefines and water vapour into alcohols by subjecting them to the action of a catalytically active solid hydration catalyst comprising essentially a hydration phosphate catalyst and excess phosphoric acid, the step of rendering the catalyst physically stable under the reacting conditions by forming dispersed therein the residue of castor oil resulting from baking a mixture thereof with said material.

3. In the catalytic conversion of olefines and water vapour into alcohols by subjecting them to the action of a catalytically active solid hydration catalyst comprising essentially a hydration phosphate catalyst and excess phosphoric acid, the step of rendering the catalyst physically stable under the reacting conditions by forming dispersed therein the residue of rape oil resulting from baking a mixture thereof with said material.

4. In the catalytic conversion of olefines and water vapour into alcohols by subjecting them to the action of a catalytically active solid hydration catalyst comprising essentially a hydration phosphate catalyst and excess phosphoric acid, the step of rendering the catalyst physically stable under the reacting conditions by forming dispersed therein the residue of a non-drying vegetable oil resulting from making a mixture thereof with said material, grinding the baked mixture, tabletting it with linseed oil and re-baking.

5. In the catalytic conversion of olefines and water vapour into alcohols by subjecting them to the action of a catalytically active solid hydration catalyst comprising essentially a hydration phosphate catalyst and excess phosphoric acid, the step of rendering the catalyst physically stable under the reacting conditions by forming dispersed therein the residue of castor oil resulting from baking a mixture thereof with said material, grinding the baked mixture, tabletting it with linseed oil and rebaking.

6. In the catalytic conversion of olefines and water vapour into alcohols by subjecting them to the action of a catalytically active solid hydration catalyst comprising essentially a hydration phosphate catalyst and excess phosphoric acid, the step of rendering the catalyst physically stable under the reacting conditions by forming dispersed therein the residue of rape oil resulting from baking a mixture thereof with said material, grinding the baked mixture, tabletting it with linseed oil and re-baking.

7. The catalytic conversion of olefines and water vapor into alcohols comprising reacting them in the presence of a solid catalytic material comprising essentially a hydration phosphate catalyst in association with phosphoric acid and rendered mechanically stable by containing dispersed therein the residue of castor oil resulting from baking a mixture thereof with said material.

8. The catalytic conversion of olefines and water vapour into alcohols comprising reacting them in the presence of a solid catalytic material comprising essentially a hydration phosphate catalyst in association with phosphoric acid and rendered mechanically stable by containing dispersed therein the residue of rape oil resulting from baking a mixture thereof with said material.

9. The catalytic conversion of olefines and water vapour into alcohols comprising reacting them in the presence of a solid catalytic material comprising essentially a hydration phosphate catalyst in association with phosphoric acid and rendered mechanically stable by containing dispersed therein the residue of a non-drying vegetable oil resulting from baking a mixture thereof with said material.

10. The catalytic conversion of olefines and water vapor into alcohols comprising reacting them in the presence of a solid catalytic material comprising essentially a hydration phosphate catalyst in association with phosphoric acid and rendered mechanically stable by containing dispersed therein the residue of castor oil resulting from baking a mixture thereof with said material, grinding the baked mixture, tabletting it with linseed oil and re-bakng.

11. The catalytic conversion of olefines and water vapor into alcohols comprising reacting them in the presence of a solid catalytic material comprising essentially a hydration phosphate catalyst in association with phosphoric acid and rendered mechanically stable by containing dispersed therein the residue of rape oil resulting from baking a mixture thereof with said material, grinding the baked mixture, tabletting it with linseed oil and re-baking.

12. The catalytic conversion of olefines and water vapor into alcohols comprising reacting them in the presence of a solid catalytic material comprising essentially a hydration phosphate catalyst in association with phosphoric acid and rendered mechanically stable by containing dispersed therein the residue of a non-drying vegetable oil resulting from baking a mixture thereof with said material, grinding the baked mixture, tabletting it with linseed oil and re-baking.

WALTER PHILIP JOSHUA.
HERBERT MUGGLETON STANLEY.
JOHN BLAIR DYMOCK.